Aug. 28, 1945.  J. C. PURVES ET AL  2,383,460
MAGNETIC FIELD RESPONSIVE DEVICE
Filed March 28, 1941  2 Sheets—Sheet 1

INVENTORS
JOHN C. PURVES
LENNOX F. BEACH
BY *Herbert H. Thompson*
THEIR ATTORNEY.

Aug. 28, 1945.   J. C. PURVES ET AL   2,383,460
MAGNETIC FIELD RESPONSIVE DEVICE
Filed March 28, 1941   2 Sheets-Sheet 2
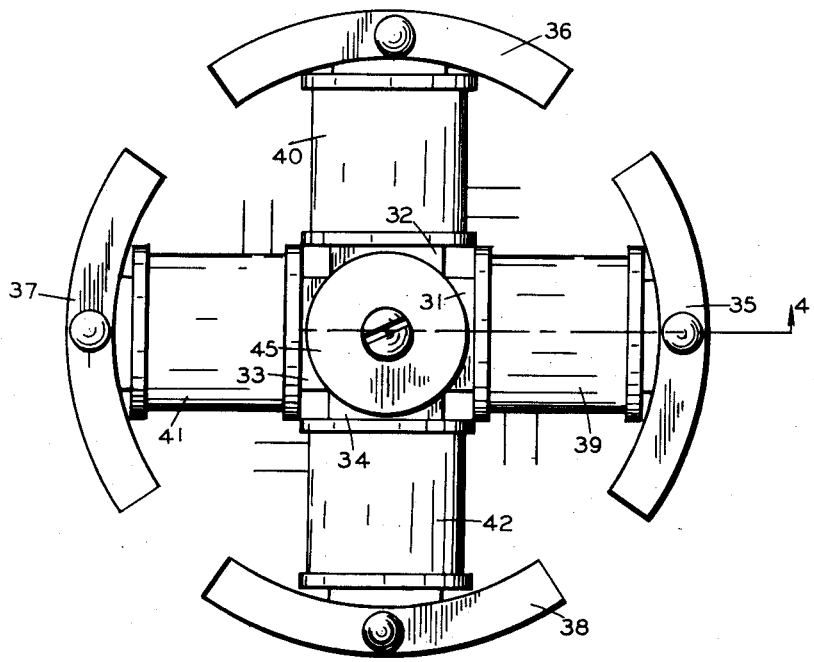
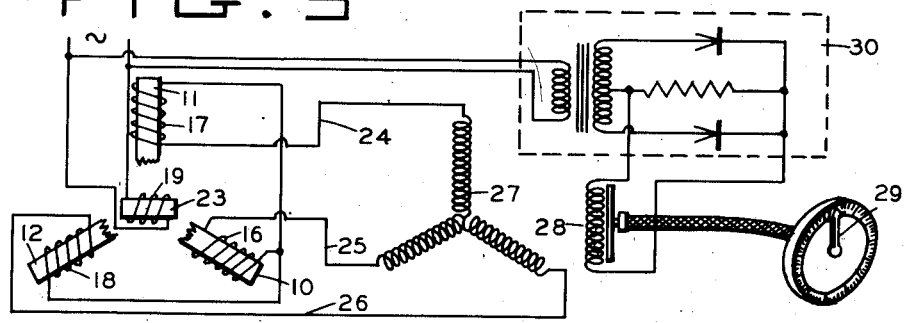
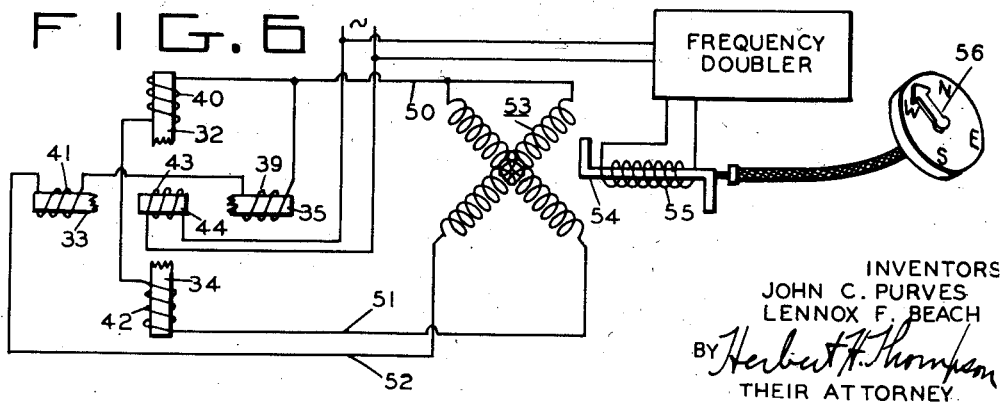
INVENTORS
JOHN C. PURVES
LENNOX F. BEACH
BY *Herbert H. Thompson*
THEIR ATTORNEY.

Patented Aug. 28, 1945

2,383,460

UNITED STATES PATENT OFFICE 2,383,460

MAGNETIC FIELD RESPONSIVE DEVICE

John C. Purves, Springfield, Mass., and Lennox F. Beach, Merrick, N. Y., assignors to Purves Corporation, a corporation of Massachusetts Application March 28, 1941, Serial No. 385,622

19 Claims. (Cl. 177—380)

This invention relates to a magnetic field responsive device and particularly to a transmitter for a magnetic compass of the stationary, induction, A. C. excited, type in which a magnetically permeable core is periodically brought to substantial magnetic saturation to obtain a varying electro-motive force in the secondary or pick-up winding of the transmitter. The output of the transmitter may be suitably utilized, as herewith illustrated, to operate an indicating receiver device by which deviation of the transmitter from a given position in a magnetic field is shown.

Various fundamental types of transmitters in which a periodically varying magnetic flux is induced are particularly described in the patent to Haig Antranikian, No. 2,047,609, dated July 14, 1936, for a Magnetic field direction and intensity finder, and also in the pending application of Lennox F. Beach, Serial No. 348,582, filed July 30, 1940, for a Direction indicator for magnetic fields. The present invention is an improvement in the above noted cases.

The object of the invention is primarily to simplify the construction of a device of this character, and to obviate duplication of the exciter units heretofore employed with a multipole type of such transmitter and consequently decrease its weight.

An important feature of the invention resides in the formation of a multi-pole transmitter arrangement having a single exciter for energizing the cores of the same.

Another feature of the invention consists in employing a single exciting winding for producing balanced saturating fluxes in a multipolar transmitter of the character described, thus eliminating inaccuracies caused by differences in individual exciting windings.

Another feature of the invention consists in the utilization of the core of the exciter as a connecting structural member by means of which the respective pick-up cores of the transmitter instrument are capable of being joined.

A further feature of the invention resides in the provision of a split pick-up or secondary core for the transmitter to obtain a closed magnetic circuit in which the flow of flux induced therein by the exciter is balanced.

Still another feature of the invention is contained in the provision of a magnetically permeable shield for the exciter by means of which a balanced magnetic circuit is completed in a portion of each of the pick-up cores of the transmitter.

Another feature of the invention resides in the provision of means by which the relation of the parts of the transmitter are or may be so adjusted as to obviate the generation of an E. M. F. in the pick-up coil of the fundamental frequency of the source due to leakage in the magnetic circuit of the induced exciting flux.

Other objects, features and structural details of the invention will be apparent from the following description when read in connection with the accompanying drawings, wherein—

Fig. 3 is a plan view of a modified construction of the improved transmitter.

Fig. 5 is a schematic diagram illustrating the use of the transmitter in a magnetic compass device with a receiving instrument of the "Selsyn" type for the output of the transmitter.

Fig. 6 is a schematic diagram showing employment of the form of transmitter in Fig. 3 in a magnetic compass device, a suitable two-phase synchronous receiver being used in this instance to receive the output of the transmitter.

Figure 1:
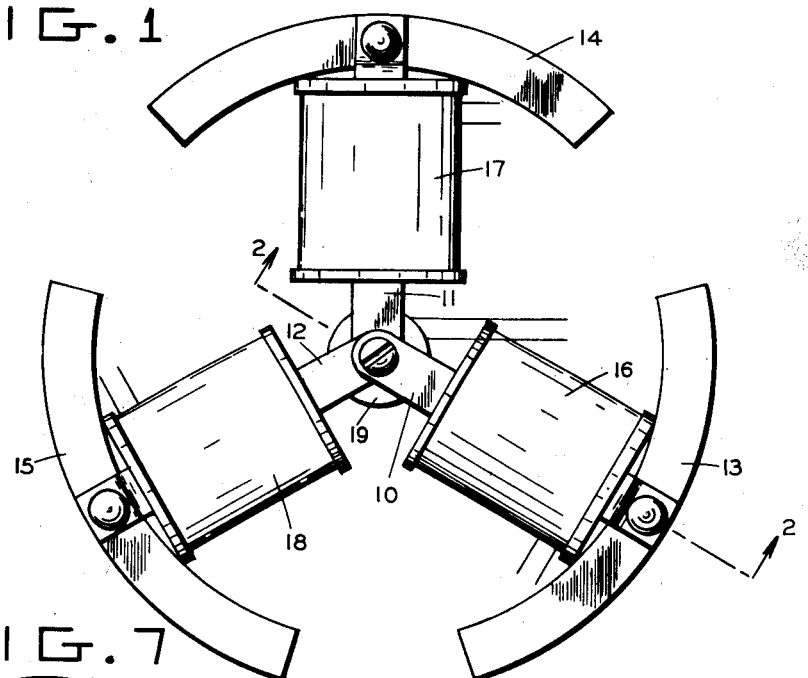
Fig. 1 is a plan view showing the preferred form of transmitter constructed in accordance with the present invention.
Figure 2:
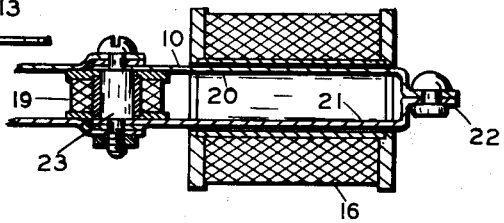
Fig. 2 is a cross section taken on line 2—2, Fig. 1, illustrating one of the pole units in detail.

With particular reference to Figs. 1, 2 and 5 of the drawings, the improved transmitter is preferably multipolar in form and has, in this instance, three elongated magnetically permeable pick-up cores which are designated in Fig. 1 by the reference numbers 10, 11 and 12. These cores are radially arranged in preferably coplanar relationship and preferably equidistantly spaced from one another, each of the same preferably having a magnetic field collector as indicated respectively at 13, 14 and 15 situated at the peripherally disposed end thereof. A pick-up coil is also provided for each of the designated secondary cores 10, 11 and 12, such coils being indicated respectively at 16, 17 and 18. The coil of an exciter 19 having a primary magnetic core associated therewith is located at the center of the radially arranged secondary cores, the core of the exciter forming a suitable structural member by means of which the respective poles of the transmitter are connected in this form of the invention, as will hereinafter be more particularly described.

As shown in Fig. 2, each of the depicted secondary plural core units, in this instance core 10, is formed of two substantially parallel spaced parts 20 and 21, the same being preferably constructed of elongated flat pieces of magnetically permeable material. A spacing connection 22 joins the magnetically permeable material at the peripherally disposed ends of the respective pick-up cores. The connecting, centrally located, core of the exciter 19 or intermediate core which maintains the respective parts of the split cores 10, 11 and 12 in spaced relationship is indicated at 23. The exciter 19 is situated between the spaced parts 20 and 21 of the primary cores. Also, the primary core or exciter core is perpendicularly positioned with relation to the longitudinal axes of the respective elongated pick-up or secondary cores, the opposite end portions of the core 23 contacting the respective spaced parts of the secondary core or cores to form a closed magnetic circuit therewith. The primary core is constructed, in this instance, in the form of a threaded fastening which is adapted to secure the various parts of the transmitter in the arranged relationship and manner clearly shown in Figs. 1 and 2. This connection may obviously be made in other suitable manners, such as by a riveted fastening.

In this designated type of transmitter (see Fig. 5) a suitable source of alternating current supplies energy to the windings of the exciter 19 to introduce a periodically varying magnetic flux in the respective pick-up cores from the common primary core 23. As shown in an individual case, in Fig. 2, such a reversing flow of flux occurs in the closed magnetic circuit formed by the source or primary core 23, elongated secondary core part 20, connection 22 and core part 21. This structural arrangement of primary and secondary cores forms a means by which the flux induced in the respective pick-up cores 10, 11 and 12 of the transmitter by the exciter is balanced so that the combination of the component of the earth's magnetic field in the respective pick-up cores and the flux induced therein by the exciter provides an unbalanced periodic flow of flux in the respective secondary cores producing a degree of magnetic saturation therein. In the form of the invention under present consideration, the exciter-induced, balanced flux occurs in the respective elongated spaced parts 20 and 21 of each of the split pick-up cores.

It will be observed on an examination of Fig. 2 that, when the exciting coil 19 is energized from the suitable source of periodically varying current such as alternating current, a flux will flow in one core part 20 in one direction and in the other core part 21 in the opposite direction for instantaneous values thereof. Since the pick-up coil 16 extends about both core parts 20 and 21, or, in other words, comprises convolutions each of which encircle both of said core parts, the periodically varying fluxes in both core parts will induce opposing E. M. F.'s in coil 16. Therefore, the E. M. F.'s induced in the pick-up coils by the exciting flux in the core parts will substantially cancel out so that the signal voltage derived from the pick-up coils through interaction of the cores with the earth's magnetic field will contain substantially no component of fundamental frequency or of a frequency of the electrical energy employed in producing an exciting flux.

As shown in Fig. 5, the windings of the respective pick-up or secondary coils 16, 17 and 18 are Y-connected and through the leads 24, 25 and 26 are connected to the respective stator windings of a "Selsyn" type receiver 27, the rotor winding 28 of which controls a suitable indicator 29 for a compass or like device. This effect is obtained inasmuch as the voltages across the three leads 24, 25 and 26 are proportional to three symmetrical components of the magnetic field in which the transmitter is located, the same being utilized to reproduce the direction of the field by the "Selsyn" receiver as is well known in the art. Inasmuch as the frequency of the transmitter output voltage is double that of the source of the alternating current supplied the exciter, it is desirable to provide a suitable frequency doubling arrangement as shown at 30 which is interposed between the source of alternating current and the rotor winding 28 of the "Selsyn" receiver 27. The combined voltage output of the respective coils 16, 17 and 18 of the transmitter is consequently employed to operate an indicating receiver device which indicates an angular relation of an axis of the transmitter in an external magnetic field, such as the earth's field.

Figures 4, 8:
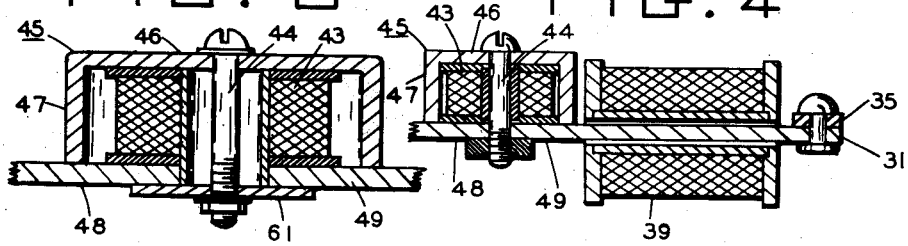
Fig. 4 is a cross section on line 4—4, Fig. 3, showing in detail a single pole unit of the transmitter.
Fig. 8 is an enlarged central vertical cross section, showing in detail a modification of the exciter and shield arrangement shown in the form of transmitter illustrated in Fig. 4.

A modified arrangement of the form of the improved transmitter is illustrated in Figs. 3, 4 and 6. In this instance, the transmitter has a cruciform pick-up core which may be constructed of a single, right-angle crossed, piece of magnetically permeable material, the extending arms of which are indicated in Fig. 3 at 31, 32, 33 and 34. The field collectors may be suitably mounted on the ends of the pick-up core arms, the same being peripherally situated and indicated in the drawings by the reference numbers 35, 36, 37 and 38, respectively. Each of the elongated radially extending pick-up or secondary cores is provided with a pick-up coil as respectively shown at 39, 40, 41 and 42. A coil of a single exciter 43 (see Fig. 4) and the primary core 44 for the same is located at the center of the radially extending secondary cores 31, 32, 33 and 34, the primary or exciter core also being perpendicularly situated with respect to the longitudinal axes of the respective pick-up cores. A cylindrical cup-shaped, magnetically permeable shield 45 is secured in position over the exciter coil 43 by the core 44 which is also constituted to form a suitable screw, or other desired fastening, as clearly shown in Fig. 4. The upward or free magnetic end of the exciter core 44, magnetically contacts the top 46 of the shield and the annular base formed by the cylindrical side portions 47 of the shield contact the respective pick-up cores of the transmitter at a distance from the zone in which the pick-up cores and the single core 44 contact each other at the common center of the secondary core structure. A closed magnetic circuit in which the flux due to the exciter is balanced in a portion of the respective pick-up cores, as indicated at 48 and 49 (see Fig. 4) is consequently obtained.

With reference to Fig. 6, the windings of the oppositely disposed pick-up coils 39—41, 40—42, are paired so that the fields of the transmitting windings are situated at right angles to one another. The relative voltages induced in the respective coils in leads 50, 51 and 52 are consequently proportional to the corresponding component of the magnetic field in which the transmitter is located, the leads being connected to a receiver 53 adapted to reproduce angular position and having two stator coils arranged at right angles to one another. A rotatable inductor 54 is excited by a stationary winding 55 for the receiver 53, the winding 55 being connected to the source of alternating current by means of a frequency doubler, as indicated by the legend, which may be of the character of the frequency doubler 30 shown in Fig. 5 and previously described, the inductor 54 controlling the operation of a suitable indicator 56 which shows the deviation of the transmitter from a given position in a magnetic field.

Figure 7:
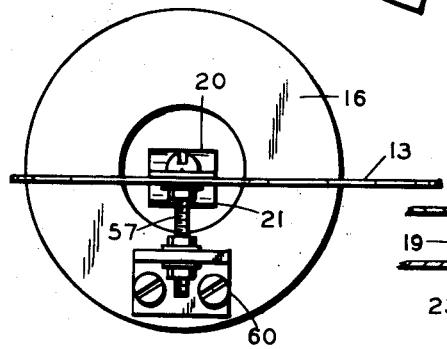
Fig. 7 is an enlarged end elevation illustrating a modification of the split core type of construction shown in Fig. 2.

In order to obviate any tendency of the pick-up coils to generate an E. M. F. of the same fundamental frequency as that of the source of A. C. provided for the exciter due to unbalanced flux leakage in the respectively provided balanced magnetic circuits, reference is directed to Figs. 7 and 8, in which provision is made for counterbalancing such flux leakage. In Fig. 7, showing the split pick-up core form of the invention, we provide, for this purpose, a suitable screw fastening adjustment as indicated at 57, one part of which is secured to a suitable base 60 fastened to the end of the stationary coil 16 and the other part of which is connected to the extending spacing connection 22 of the pick-up cores, such as 10 in Fig. 2. In the form of invention shown in Fig. 7 considerable clearance space is provided between the interior of the coil 16 and the spaced split core parts 20 and 21, the fastening providing means for adjusting the transverse position of the split pick-up core with respect to the pick-up coil so as to position these parts to obtain a balance in the flux leakage in the magnetic circuit and consequently avoid the generation in the coil of an E. M. F. of the same fundamental frequency as that of the A. C. source of energy supplied to the exciter.

In Fig. 8, the construction shown to accomplish this purpose in the form of transmitter illustrated in Figs. 3 and 4 includes a washer 61 of magnetically permeable material provided to complete the magnetic circuit in the oppositely disposed flux balanced portions 48 and 49 of the pick-up cores of the transmitter. As shown herein, the shield 45 and exciter core 44 is adjustable, by the illustrated screw fastening connection of the parts, with relation to the pick-up cores of the transmitter to obtain the required degree of counterbalance of the induced flux losses affecting the respective pick-up coils.

By the present invention, it is also apparent that ready adjustment may be made in the angular spacing position of the respective secondary cores of a multipolar type of such transmitter to compensate or balance errors in the operation of the same.

In the multipolar type of transmitter shown in Fig. 1, the coils 16, 17 and 18 are suitably mounted for longitudinal adjustment with respect to these associated cores 10, 11 and 12 to particularly facilitate calibration of the device.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim as our invention:

1. A magnetic field responsive device comprising a magnetic circuit having a pair of substantially parallel elongated arms of magnetically permeable material, means for producing respective periodically varying fluxes instantaneously flowing in opposite directions in respective ones of said arms, said fluxes being of sufficient magnitude to operate said arms in varying permeability portions of their magnetic characteristics, and a pick-up coil having convolutions each wound about both of said arms whereby, in the absence of an external magnetic field, the effects of said fluxes on said coil balance out, but in the presence of said external field, a resultant alternating voltage is produced in said pick-up coil having phase sense and magnitude corresponding to the direction of said field relative to said arms.

2. A magnetic field responsive device comprising a magnetic circuit having a pair of substantially parallel elongated arms of magnetically permeable material, means for producing respective periodically varying fluxes instantaneously flowing in opposite directions in respective ones of said arms, said fluxes being of sufficient magnitude to operate said arms in varying permeability portions of their magnetic characteristics, and a pick-up coil having convolutions each of which is inductively coupled with both of said arms in such manner that in the absence of an external field the effects of said fluxes on said coil balance out, whereby in the presence of said field a resultant alternating voltage is produced in said pick-up coil having phase sense and magnitude corresponding to the direction of said field relative to said arms.

3. A magnetic field responsive device comprising a plurality of angularly disposed arms, each of said arms comprising a magnetic circuit having a pair of substantially parallel elongated members of magnetically permeable material, means for producing respective fluxes instantaneously flowing in opposite directions in respective ones of each pair of said members, said fluxes being of sufficient magnitudes to operate said arms in varying permeability portions of their magnetic characteristics, and a pick-up coil wound about each pair of said members whereby, in the absence of an external magnetic field, the effects of said fluxes on said coils balance out, but in the presence of said external field resultant alternating voltages are produced in said coils having phase senses and magnitudes corresponding to the orientations of said arms relative to the direction of said field.

4. In a device sensitive to a magnetic field, an inductor comprising a pair of laterally spaced, elongated core members of permeable magnetic material, a core member disposed therebetween, means for producing a periodically varying flux in the latter core member, a pick-up winding having convolutions thereof each encircling both members of said pair of core members, and means for relatively adjusting said pick-up winding and one of said pair of laterally spaced core members.

5. In a device sensitive to a magnetic field, an inductor comprising a pair of laterally spaced, elongated core members of permeable magnetic material, a core member disposed therebetween, means for producing a periodically varying flux in the latter core member, a pick-up winding having convolutions thereof each encircling both members of said pair of core members, and means for relatively adjusting said pick-up winding and one of said pair of spaced core members in a direction transversely of the longitudinal axis of said pick-up winding.

6. In a device sensitive to a magnetic field, an inductor comprising a pair of core members of permeable magnetic material, a pick-up winding, said core members passing axially through said winding, an intermediate core member disposed between and with its longitudinal axis substantially normal to said pair of core members, and an exciting winding surrounding said intermediate core member.

7. In a device sensitive to a magnetic field, an inductor comprising a pair of core members of permeable magnetic material, said members being connected at one end thereof to form a path for the flow of flux therebetween but relatively spaced in a zone remote from said end, an intermediate core extending between and with its longitudinal axis substantially normal to said pair of core members in the relatively spaced zone thereof, an exciting coil surrounding said intermediate core, and a pick-up winding having convolutions thereof each encircling both members of said pair of core members.

8. In a device sensitive to a magnetic field, an inductor comprising a plurality of relatively radially arranged core legs, each of said legs comprising a pair of laterally spaced, elongated core members of permeable magnetic material, a common, intermediate core member disposed between the core members of all of said legs, means for producing a periodically varying flux in said intermediate core member, and a plurality of pick-up windings associated respectively with said core legs and each pick-up winding having convolutions each encircling both of its associated pair of core members.

9. In a device sensitive to a magnetic field, an inductor comprising a plurality of relatively radially arranged core legs, each of said legs comprising a pair of laterally spaced, elongated core members of permeable magnetic material, a common, intermedaite core member extending between the core members of all of said legs with its longitudinal axis substantially normal to said core members, an exciting winding surrounding said intermediate core member, and a plurality of pick-up windings associated respectively with said core legs and each pick-up winding having convolutions, each encircling both of its associated pair of core members.

10. In a device sensitive to an external unidirectional magnetic field for supplying signal voltage outputs dependent in magnitude upon the direction of said field relative thereto, inductor means of permeable magnetic material arranged to lie along the sides of a polygonal frame, a source of periodically varying current, an exciting winding connected with said current source and surrounding one of said frame sides for producing a periodically varying flux circulating about said frame, whereby the fluxes flowing in opposite frame sides are of equal magnitude but flow in opposite directions for instantaneous values thereof, and a pick-up winding having convolutions each encircling said opposite sides of said frame whereby zero voltage will be induced in said pick-up winding by said circulating fluxes while a periodically varying signal voltage output is produced by said pick-up winding having a periodicity of variation substantially twice that of said flux and having a magnitude dependent upon the direction of said field relative to said frame.

11. In a device sensitive to a magnetic field, inductor means of permeable magnetic material arranged to lie along the sides of a polygonal frame, an exciting winding surrounding one side of said frame, a pick-up winding having convolutions each encircling opposite sides of said frame, and means for relatively adjusting the position of said pick-up winding and one of the frame sides extending therethrough in a direction transversely of the longitudinal axis of said pick-up winding.

12. In a device sensitive to a magnetic field, a first core, an exciting coil surrounding said core, a plurality of core legs of permeable magnetic material extending radially from both ends of said first core, and a plurality of pick-up windings each being inductively coupled respectively with a pair of core legs, the legs of which extend from opposite ends of said first core.

13. In a device sensitive to a magnetic field, an inductor comprising a first core having an exciting coil extending thereabout and a second core of permeable magnetic material extending substantially normal to said first core from adjacent one end thereof, a pick-up winding inductively associated with said second core, and a shield of magnetic material extending from a zone adjacent said second core and in spaced relation to said first core to the other end of said first core.

14. In a device sensitive to a magnetic field, an inductor comprising a first core having an exciting coil extending thereabout and a second core comprising a plurality of legs of permeable magnetic material extending radially from adjacent one end of said first core, pick-up windings disposed respectively about the radial core legs, and permeable magnetic means extending from a zone adjacent said radial core legs and between said pick-up windings and first core to the end of said first core remote from said second core.

15. In a device sensitive to an external unidirectional magnetic field for supplying signal voltage outputs dependent in magnitude upon the direction of said field relative thereto, an inductor comprising a plurality of core legs having the axes thereof extending in coplanar and in relative radial relationship, and an exciting core disposed with its axis normal to and adjacent the inner ends of all of said core legs, an exciting coil associated with said exciting core and adapted when connected with a source of periodically varying current to produce periodically varying fluxes in said exciting core and said core legs, and pick-up windings respectively surrounding said core legs and adapted to supply said signal voltage outputs.

16. In a device sensitive to an external, unidirectional magnetic field for supplying a signal voltage output dependent in magnitude upon the direction of said field relative thereto, an inductor comprising a pair of laterally spaced, elongated core members of permeable magnetic material, a core member disposed therebetween, means for producing a periodically varying flux in the latter core member whereby to provide equal fluxes flowing in opposite directions for instantaneous values thereof in respective ones of said pair of core members, and a pick-up winding having convolutions thereof each encircling both members of said pair of core members, whereby the effects of said fluxes on said pick-up winding balance out and in the presence of said external field a signal voltage output having a magnitude dependent upon the direction of said field relative to said pair of core members is produced in said winding.

17. In a device sensitive to an external, unidirectional magnetic field for supplying a signal voltage output dependent in magnitude upon the direction of said field relative thereto, an inductor comprising a pair of laterally spaced, elongated core members of permeable magnetic material, a core member disposed therebetween and adjacent one end thereof, said pair of core members being connected adjacent the other end thereof to form a closed path for the flow of flux therethrough, means for producing a periodically varying flux circulating about said closed path and of equal magnitudes but in opposite directions of flow in said pair of core members, and a pick-up winding having convolutions thereof each encircling both members of said pair of core members, whereby the effects of said fluxes on said pick-up winding balance out and in the presence of said external field a signal voltage output having a magnitude dependent upon the direction of said field relative to said pair of core members is produced in said winding.

18. A device sensitive to an external unidirectional magnetic field for supplying a signal voltage output dependent in magnitude upon the direction of said field relative thereto and comprising an inductor including a pair of laterally spaced, elongated core arms of permeable magnetic material, means for producing periodically varying fluxes of substantially equal magnitudes instantaneously flowing in opposite directions in respective ones of said arms, said fluxes being of sufficient magnitude to vary the permeability of said arms, and a pick-up coil having convolutions thereof each encircling both core arms, whereby the effects of said fluxes on said pick-up coil balance out and in the presence of said external field a signal voltage output having a magnitude dependent upon the direction of said field relative to said pair of core members is produced in said coil.

19. A device for producing electromotive forces dependent in magnitude upon the direction of an external, unidirectional magnetic field relative thereto and comprising a core of permeable magnetic material including arms extending from a common central zone in radial, coplanar directions and in relative angular relation, means including a core substantially normal to the plane of said arms at said central zone for simultaneously producing a periodically varying flux in at least a portion of all of said arms sufficient periodically to vary the permeability of said arms, and pick-up windings associated respectively with each of said core arms, whereby changes in the angular relationship between the axes of the respective core arms and the direction of the external magnetic field produce changes in voltage in said pick-up windings.

JOHN C. PURVES.
LENNOX F. BEACH.